Nov. 1, 1966 V. F. ZAHODIAKIN 3,282,315
NUT MECHANICALLY FUSED IN PLACE
Filed July 9, 1964
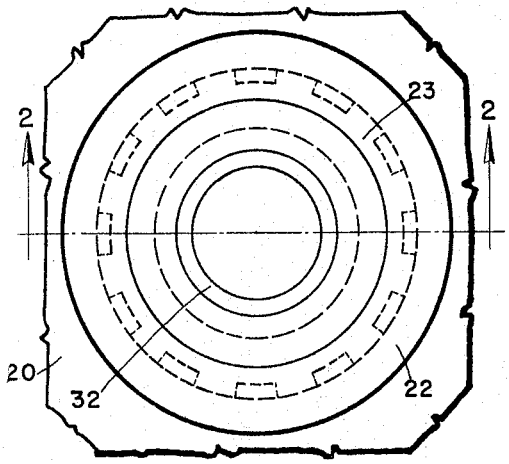
FIG.1
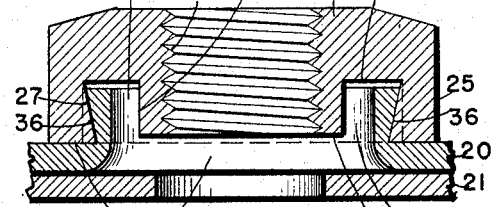
FIG.2
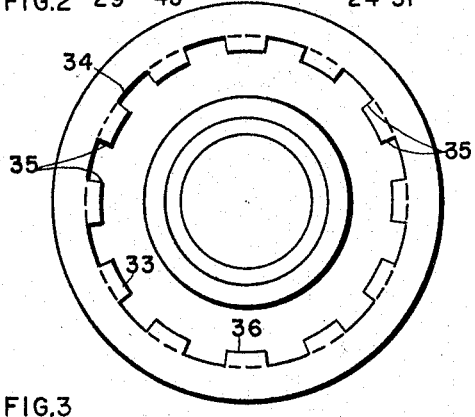
FIG.3
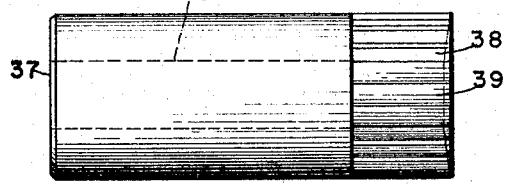
FIG.8
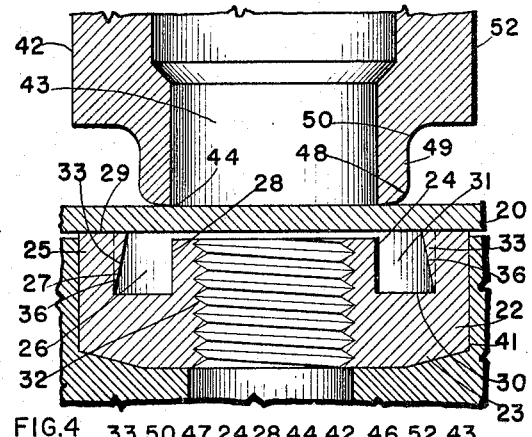
FIG.4
FIG.5
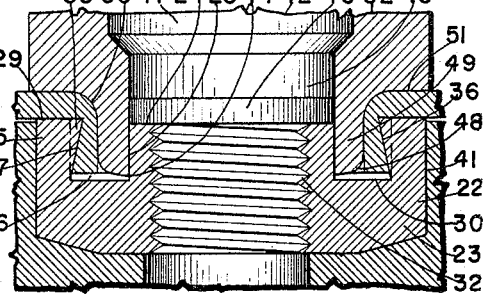
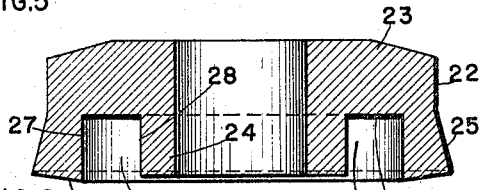
FIG.6
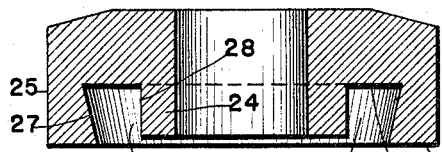
FIG.7
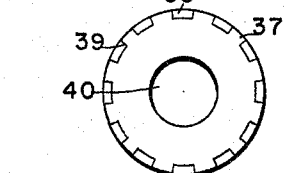
FIG.9
*INVENTOR.*
VICTOR F. ZAHODIAKIN
BY
*Howard P. King*
ATTORNEY

United States Patent Office 3,282,315
Patented Nov. 1, 1966

3,282,315
NUT MECHANICALLY FUSED IN PLACE
Victor F. Zahodiakin, Summit, N.J.; Tania Zahodiakin, administratrix of said Victor F. Zahodiakin, deceased
Filed July 9, 1964, Ser. No. 381,491
3 Claims. (Cl. 151—41.73)

This invention relates to nuts mechanically fused in place and particularly to nuts permanently attached in place in use.

In its broad aspect, the invention proposes a nut that will be very positively secured both against any possible rotation or any possible escape in an axial direction from the utilitarian element on which it is mounted for use.

An essential object of the invention is to provide a nut having an annular groove in its bottom face coaxial to the threaded bore of the nut, with undercut projections directed radially inwardly of the groove and each projection having its side edges parallel to each other.

Supplemental to the foregoing object, the invention provides channels between successive projections with each channel having a greater width next to the rim of the nut than at its open side toward the axis.

More in detail, the invention contemplates a nut having a discal body integral with which is formed a hub and a rim both of which extend in the same general direction coaxially to each other and to the discal body and provide an annular groove between the rim and hub, said rim having radial projections alternating with channels therebetween, both the groove and channels having tapers that will interlock with and prevent withdrawal of metal of an element forced thereinto.

The invention also contemplates improved mode of manufacture and assembly in place upon the ultimate element with which it is permanently attached, utilizing the hub of the nut in the role of a punch.

Other objects, advantages, beneficial results, and novel features of the nut, as well as in the means and method of manufacture and mounting thereof, will appear to persons skilled in the art to which the invention appertains, as the description proceeds, both by direct recitation thereof and by implication from the context.

Referring to the accompanying drawing, in which like numerals of reference indicate similar parts throughout the several views;

FIGURE 1 is a top plan of a nut mounted in permanent position on the ultimate element (fragmentary portion only whereof is shown) at the appointed place of use;

FIGURE 2 is a cross-section taken on line 2—2 of FIG. 1;

FIGURE 3 is a bottom plan, looking upwardly of the nut;

FIGURE 4 is a sectional view with the nut inverted from position shown in the section of FIG. 2, and with the nut located in a die nest and with the sheet metal ultimate element in appointed position thereover and a combined punch and forming die thereabove preparatory to permanently securing the nut to said element;

FIGURE 5 is a sectional view similar to FIG. 4 and showing the completed operation having been performed of punching said element and of interlocking the same with the nut;

FIGURES 6 and 7 are sectional views of the nut as it appears in two successive stages of manufacture; and FIGURES 8 and 9 are elevation and end views respectively of a channel punch for performing a further step in the manufacture of the nut.

In the specific embodiment of the invention illustrated in said drawing, it is emphasized at the outset that the nut of the present invention is one which is to be applied at a factory in appointed position upon an element to which it is directly and permanently secured in its ultimate place of use. While the use of the nut is with respect to sheet metal, it finds many applications in industry such as in aircraft, motor vehicles, electronic equipment, building constructions, and innumerable other structures. For purposes of this disclosure, a portion of a metallic panel is shown as the ultimate element 20 to which the nut is secured, and a portion of another panel is shown as a supplemental element to be bolted thereto. When the nut, designated generally by numeral 22, is once secured in its appointed position of use on the ultimate element 20, it cannot be disturbed or disengaged by introduction or removal of the bolt, nor by any manner of rough treatment to which it may be subjected.

Said nut 22 is primarily a body of revolution, and comprises a discal body 23 the size of which is representative of the diameter of the fabricated nut. At what may be termed the bottom of said discal body, coaxial therewith, are two extensions of which one is a central hub 24 and the other is a peripheral rim 25, said hub and rim having an annular groove 26 therebetween. In its stage of initial formation, said rim 25 flares outwardly downwardly as shown in FIG. 6, and in this status of rim, said groove 26 is rectangular in cross section, that is, its side wall 27 constituting the groove wall at the inner side of the rim, is a true cylinder and is coaxially parallel to the other groove wall 28 which also constitutes the periphery of hub 24. The bottom face 29 of the rim, as viewed in longitudinal section, is perpendicular to the flare of rim 25.

The next step in fabrication of the nut 22 comprises forcefully compressing or contracting the flare of the rim 25, as has been done in FIG. 7, so that the outer periphery thereof conforms to and is in surface continuation of the cylindrical outer periphery of the discal body 23. Resultant from such compression or deflection of the rim, the inner wall 27 thereof, which faces inwardly of the groove 26, is caused to taper downwardly inwardly, with the direction of taper converging below the bottom plane of the nut. The taper being from a maximum diameter at the upper closed spine 30 of the groove to a less diameter at the open breast 31 of the groove, establishes an undercut status thereto so that the bottom or open breast of the groove is radially smaller than the upper or closed spine of the groove. This undercut provides for axial interlock with the element to which the nut is attached as will be more fully described hereinafter.

It may be here noted, that the bottom face 29 of rim 25, in consequence of the deflection of the rim inwardly, becomes planar perpendicular to the axis in continuance of its attribute, above described, of cross-sectional perpendicularity to the outer periphery of the rim. Preferably the plane of the bottom face 29 of the rim 25 in this final planar condition, is slightly lower than the plane of the bottom face of the hub, to assure surface contact of said rim bottom face 29 with the ultimate element 20 to which applied in use. At a convenient stage of fabrication, the hub 24 is internally screw-threaded, as at 32, for reception of a bolt (not shown). Those screw-threads extend throughout the length of the hub, from top to bottom of the nut, and therefore, are in part opposite the nut rim.

The sloping or undercut wall 27 of the rim 25 is provided with additional means for obtaining interlock against rotation with respect to the directly attached ultimate element 20. Such a means conveniently is constituted by dividing the undercut taper, in axial directions, into an annular series of alternate projections 33 and intervening channels 34, the side edges or faces 35 of the projections constituting the sides of the channels. By virtue of the taper of the rim inner wall 27 providing the projections 33 and channels 34, the inwardly directed face 36 of each projection is a narrow division of said wall and therefore tapers longitudinally of the projection. Due to said taper the radial dimension of each projection and channel next to the bottom 29 of the rim will be maximum and progressively decreases in approach to the top end of the projection. Viewed at the bottom of the nut (or in cross-section on any plane normal to the nut axis) said projections 33 will be seen as rectangular with the two side edges or faces 35 of each projection being triangular and in parallelism to each other. As a consequence, the sides of a channel 34 defined by facing sides 35 of two of the projections, will be in planes longitudinally parallel to the nut axis, but said planes converge and will intersect before reaching the axis. Resultant from this circumstance, the channels are trapezoidal in bottom view of the nut with the width next to the rim greater than the width more proximate to the axis. This affords lateral under-cut by the sides 35 of the projections in a peripheral direction in addition to the under-cut in an axial direction provided by the above-described longitudinal taper of the inward face 36 of each projection 33. Said lateral under-cut in a peripheral direction has great importance in the use of the nut, as metal once forced into the channel will have no tendency to ride onto the projection but will interlock more strongly therewith during any attempt to twist the nut.

In order to produce the afore-mentioned projections and channels, a suitable channel punch 37 is provided having longitudinal flutes 38 and splines 39 of appropriate cross-section to produce the above-described shape of projections 33 and channels 34 in the tapered wall 27 of the nut groove 26, the maximum diameter of the punch corresponding to the maximum diameter of said groove. The punch 37 has an internal bore 40 properly proportioned to slidably ride onto the hub 24 of the nut 22. After the projections 33 and channels 34 are formed in the tapered wall 27 of the nut 22, the nut is ready for permanent installation on the ultimate element 20 in appointed position of use therewith.

Referring now to the means and method of attachment, attention is first directed to FIG. 4, wherein the nut 22 is shown inverted from position shown and described with respect to FIGS. 5 and 6, and is cradled in a die nest 41 appropriately conforming in size and shape to the exterior configuration of the nut. This die nest 41, in practice, will be retained in the bed of any suitable power press (not shown). Then the ultimate element 20 is placed over the die nest and nut in appointed position where the nut is to be applied.

Coaxially above the die nest 41 is a combined punch and forming die 42, fixed of course in a depressible plunger (not shown) of the power press. The interior of the said die 42 has a bore 43 extending to the bottom of said die and there provides a shearing edge 44 conforming to the size and shape of the outer periphery of the hub 24 defined by the groove wall 28, so that said shearing edge 44 will cooperate with said wall 28 to punch a hole 45 in the element 20 coaxial to the hub and nut. The severed slug 46 will be driven upwardly of the die bore 43 and into an enlargement 47 of said bore from which said slug will eventually be discarded.

The lower end of the combined die 42, radially outwardly from shearing edge 44 thereof, is peripherally rounded or convex to constitute a bending nose 48 in surface continuation with the outer periphery of a coaxial forming sleeve portion 49 of said die extending upwardly from said nose. The upper end of the sleeve 49 terminates with an external concave fillet 50 which merges outwardly with a transverse pressure shoulder 51 underlying a more substantial upper body 52 of said combined die 42. The dimensions of the element 20, nut 22 and die 42 are all taken into consideration in the determination of the radial width of groove 26 so that the die sleeve 49 enters substantially to the bottom of said groove when the die shoulder 51 attains the level of the top surface of element 20, the maximum radial width of the groove also being substantially equal to the sum of the radial thickness of the die sleeve 49 and thickness of element 20. Consequently, as the die sleeve forces the margin around punched hole 45 of the material of element 20 into said groove, a deformation of the outer surface of the depressed material takes place forcing the material both inwardly against the under-cut tapered inward faces 36 of the projections 33 of the nut, and also forcing some of the element material into the channels 34 to interlock with the undercut side edges 35 of the channels. Removal of the combined punch and forming die 42 from the nut 22 and withdrawal of the nut from die nest 41 leaves the nut in its permanently attached position securely fixed on the ultimate element 20 ready to receive the bolt and retain the supplemental element 21 bolted in place. The dual interlocks above described, will securely retain the nut 22 from axial displacement and from rotation with respect to the utimate element 20 directly in place of use in the mode and manner above described and it cannot rotate or escape or be loosened under any conditions of use or misuse.

I claim:

1. A cylindrical nut having a discal body and two extensions concentric therewith and with each other, one said extension being an annular rim in outer surface continuation of the periphery of the discal body and having a bottom end in a plane parallel to said discal body, and the other said extension comprising a hollow hub internally screw threaded and having an end in a plane substantially at and parallel to the first said plane, and said nut having an annular groove between said rim and hub and said groove being open at the bottom face of the nut, said hub having an external cylindrical surface intersecting said end of the hub perpendicular to said plane thereat, thereby providing a right-angle shearing corner reenforced by the full thickness of said hub, said rim having channels in the internal periphery thereof directed parallel to the axis of said nut and substantially trapezoidal in cross-section with the smaller trapezoidal dimension nearer to the axis being less than the trapezoidal dimension more remote from the axis, the radially outward faces of the channels being parallel to said axis, said channels being separated successively each from the next by an interposed projection substantially rectangular in cross-section normal to the axis and having radially inward faces tapering toward the axis with direction of taper converging below said bottom face of the nut.

2. A nut in accordance with claim 1, wherein said projections at the faces thereof toward the axis taper for the full depth of said groove toward the axis with direction of taper converging below said bottom face of the nut.

3. A nut in accordance with claim 1, wherein each trapezoidal channel has greater width next to the rim than at its open side toward the axis.

References Cited by the Examiner

UNITED STATES PATENTS

| | | | |
|---|---|---|---|
| 391,456 | 10/1888 | Cross | 29—512 |
| 1,925,753 | 9/1933 | Fitch et al. | |
| 2,165,621 | 7/1939 | Donahue et al. | 285—382.4 |
| 2,612,647 | 10/1952 | Howe. | |
| 2,869,219 | 1/1959 | Quinn | 29—512 |
| 3,213,914 | 10/1965 | Buamle | 151—41.72 |
| 3,234,987 | 2/1966 | Hentzi | 151—41.72 |

CARL W. TOMLIN, *Primary Examiner.*

M. PARSONS, Jr., *Assistant Examiner.*